United States Patent [19]
Babb

[11] Patent Number: 5,383,301
[45] Date of Patent: Jan. 24, 1995

[54] DECORATIVE INSECT TRAP

[76] Inventor: Susan E. Babb, R.D. 1 Box 313, New Hampton, N.Y. 10958

[21] Appl. No.: 158,400

[22] Filed: Nov. 29, 1993

[51] Int. Cl.$^6$ .............................................. A01M 1/14
[52] U.S. Cl. ...................................................... 43/114
[58] Field of Search .................. 43/114, 115, 113, 107

[56] References Cited

U.S. PATENT DOCUMENTS

| | | | |
|---|---|---|---|
| 537,060 | 4/1895 | Mitchamore | 43/114 |
| 693,536 | 2/1902 | Baker | 43/114 |
| 1,655,128 | 1/1928 | Berghorn | 43/114 |
| 2,911,756 | 11/1959 | Geary | 43/114 |
| 3,729,858 | 5/1973 | Bradshaw | 43/114 |
| 4,145,836 | 3/1979 | Zeller | 43/115 |
| 4,411,093 | 10/1983 | Stout et al. | 43/114 |
| 4,490,938 | 1/1985 | Baker | 43/114 |
| 4,577,434 | 3/1986 | Davis | 43/114 |
| 4,829,702 | 5/1989 | Silvandersson | 43/116 |
| 4,862,638 | 9/1989 | Stevenson | 43/114 |
| 5,031,354 | 7/1991 | Olson | 43/114 |
| 5,253,448 | 10/1993 | Byom | 43/114 |

FOREIGN PATENT DOCUMENTS 15420   7/1899   United Kingdom ................. 43/114

*Primary Examiner*—P. Austin Bradley
*Assistant Examiner*—Chuck Y. Mah
*Attorney, Agent, or Firm*—David L. Baker; Robert A. Shack

[57] ABSTRACT

A decorative insect trapping device, the decorative insect trapping device including at least two support members, the at least two support members being connected together and positioned substantially transverse to one another, a hanging mechanism for hanging the at least two connected support members, at least four insect trapping members, each of the at least four insect trapping members including a substantially laminar member, each of the substantially laminar members being provided with a decorative design thereon, and an insect trapping adhesive applied to at least one surface of the substantially laminar member, a first two of the at least four insect trapping members being suspended from a first of the at least two support members in a spaced relationship with respect to one another, and a second two of the at least four insect trapping members being suspended from a second of the at least two support members in a spaced relationship with respect to one another, each of the at least four insect trapping members additionally including a peel away backing member overlaying the insect trapping adhesive, and the insect trapping adhesive extending over the entirety of each at least one surface.

3 Claims, 3 Drawing Sheets 5,383,301

DECORATIVE INSECT TRAP

BACKGROUND

1. Field of the Invention

The present invention relates to the field of insect traps, most particularly, so-called "flypaper," which is coated with a sticky substance that traps flying insects that alight thereon.

2. Description of the Related Art

U.S. Pat. No. 5,031,354 relates to an insect trapping device for mounting on a horizontal surface that includes an elongate flexible body that is bent by the user into the shape of a tube having an insect attracting sticky substance provided on the upper surface thereof and adhesive tabs on the bottom surface thereof for adhering to the horizontal surface.

U.S. Pat. No. 4,829,702 relates to an insect trap that includes a substantially flat strip of a transparent material having an insect-holding adhesive substance on one side thereof and an attachment adhesive on the other side thereof for attaching the trap to, for example, a window pane.

U.S. Pat. No. 4,577,434 relates to a flypaper trap that includes a clear plastic outer canister formed with a plurality of staggered insect inlet holes and a flypaper element positioned therein, the flypaper element having prismatic metal flakes thereon for reflecting various colors to attract insects thereto.

U.S. Pat. No. 4,490,938 relates to an adhesive-type fly trap that includes a rigid tube coated with a layer of a non-drying adhesive which is mounted within a holder that projects beyond the tube thereby preventing adjacent objects, such as curtains and the like, from adhering to the adhesive.

U.S. Pat. No. 4,145,836 relates to a flypaper type of insecticidal device which conceals from sight the insects trapped thereon and that includes a vertically disposed series of V-shaped hoppers with an adhesive coated panel extending downward through the hoppers.

SUMMARY OF THE INVENTION

Many products are available to control flying and crawling pests. Insecticides come in a variety of forms, such as sprays, powders, granules, etc. However, all of these products have drawbacks. Many people find the smell of sprays unpleasant, and some people are actually allergic to the chemicals in the spray. Even if the user does not have an aversion or allergy to the spray, the chemicals in these products are usually toxic and dangerous. Powders and granules don't usually have an odor, but they may also trigger allergic reactions and are also made from toxic chemicals. All of these products require that people exercise caution when using them. Granules and powders, which are usually spread around the edges of base boards and in cabinets, pose a special danger to young children and pets, who may unwittingly ingest them.

While so-called "flypaper" types of insect traps are will known, they are normally quite unattractive, and become even more so in use, as the insects trapped thereon accumulate.

Accordingly, one object of the present invention is the provision of a decorative insect trap that is substantially nontoxic and hypoallergenic and therefore safe for use in nearly all environments.

Another object of the invention is the provision of an insect trap that, in addition to providing a high degree of safety, is attractive and unobtrusive when first employed and that stays relatively attractive during use.

A still further object of the invention is the provision of such an insect trap that is simple in construction and operation and, therefore, inexpensive to manufacture.

In one aspect, the invention generally features a decorative insect trap, the insect trap including: a substantially laminar member; the substantially laminar member having a peripheral border that presents a viewer thereof with a decorative representation of a silhouette of an insect; an insect trapping adhesive applied to at least one surface of the substantially laminar member; and a peel away backing member overlaying the insect trapping adhesive.

Preferably, the insect trapping adhesive is applied in a decorative pattern over substantially the entire extent of the at least one surface of the substantially laminar surface; the insect trapping adhesive is applied to the at least one surface of the substantially laminar member in a decorative pattern; and the decorative pattern includes a plurality of discrete and spatially separated individual lines of the insect trapping adhesive applied to the at least one surface of the substantially laminar member to thereby form the decorative pattern.

In another aspect, the invention generally features a decorative insect trapping device, the decorative insect trapping device including: at least one support member; and at least two insect trapping members, each of the at least two insect trapping members including: a substantially laminar member having a decorative design thereon; and an insect trapping adhesive applied in a decorative pattern to at least one surface of the substantially laminar member; the at least two insect trapping members being suspended from the at least one support member in a spaced relationship with respect to one another.

Preferably, each of the substantially laminar members is provided with a decorative design thereon; each of the at least two insect trapping members additionally includes a peel away backing member overlaying the insect trapping adhesive; the insect trapping adhesive extends over substantially the entirety of each the at least one surface; the insect trapping adhesive is applied to each at least one surface in a decorative pattern; the decorative pattern includes a plurality of discrete and spatially separated individual lines of the insect trapping adhesive applied to each the at least one surface to thereby form the decorative patterns; each of the substantially laminar members has a peripheral border that presents a viewer thereof with a decorative representation of a silhouette of an insect; each of the at least two insect trapping members additionally includes a peel away backing member overlaying the insect trapping adhesive; the insect trapping adhesive extends over substantially the entirety of each at least one surface; the insect trapping adhesive is applied to each at least one surface in a decorative pattern; the decorative pattern includes a plurality of discrete and spatially separated individual lines of the insect trapping adhesive applied to each the at least one surface to thereby form the decorative patterns; the at least one support member includes at least two support members, the two support members being positioned substantially transverse to one another, and the at least two insect trapping members includes at least four insect trapping members, each of the at least four insect trapping members including: a substantially laminar member; and an insect trapping adhesive applied to at least one surface of the substantially laminar member; a first two of the at least four insect trapping members being suspended from a first of the at least two support members in a spaced relationship with respect to one another; and a second two of the at least four insect trapping members being suspended from a second of the at least two support members in a spaced relationship with respect to one another; each of the substantially laminar members is provided with a decorative design thereon; and each of the substantially laminar members has a peripheral border that presents a viewer thereof with a decorative representation of a silhouette of an insect.

In yet another aspect, the invention generally features a decorative insect trapping device, the decorative insect trapping device including: at least two support members; the at least two support members being connected together and positioned substantially transverse to one another; a hanging mechanism for hanging the at least two connected support members; at least four insect trapping members, each of the at least four insect trapping members including: a substantially laminar member having a decorative design thereon; each of the substantially laminar members being provided with a decorative design thereon; and an insect trapping adhesive applied in a decorative manner to at least one surface of the substantially laminar member; a first two of the at least four insect trapping members being suspended from a first of the at least two support members in a spaced relationship with respect to one another; and a second two of the at least four insect trapping members being suspended from a second of the at least two support members in a spaced relationship with respect to one another; each of the at least four insect trapping members additionally including a peel away backing member overlaying the insect trapping adhesive; and the insect trapping adhesive extending over the entirety of each at least one surface.

Preferably, each of the substantially laminar members has a peripheral border that presents a viewer thereof with a decorative representation of a silhouette of an insect.

The invention will now be described by way of a particularly preferred embodiment, reference being made to the accompanying drawings, wherein:

DESCRIPTION OF THE PREFERRED EMBODIMENT

Figure 1:
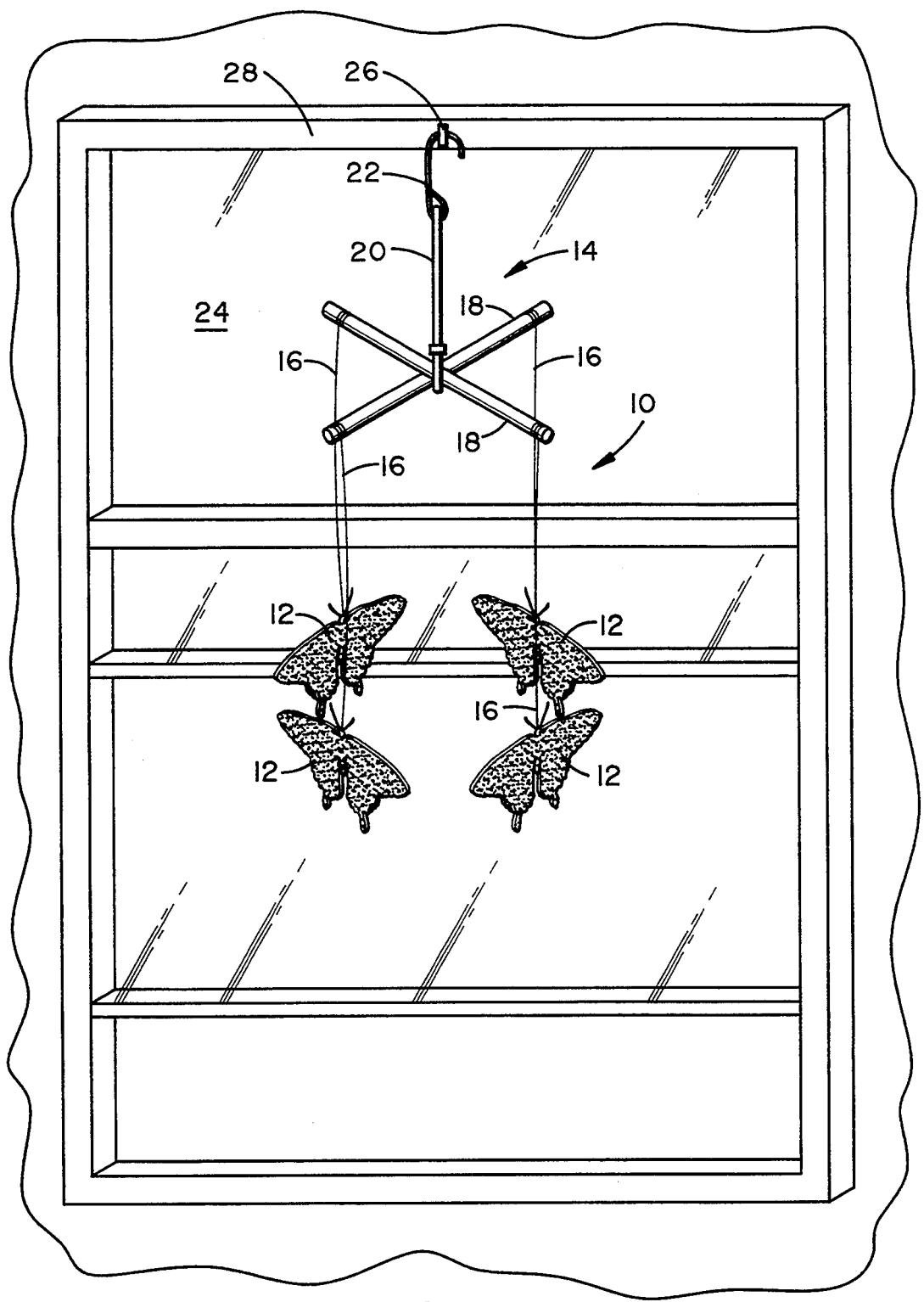
FIG. 1 is a perspective view of a decorative insect trap constructed according to the invention.

Referring initially now to FIG. 1, a decorative insect trap 10 constructed according to the present invention generally includes a plurality of insect trapping members 12 suspended from a supporting structure 14 by strings 16 that may be cotton twine, nylon filament, etc. In the preferred embodiment illustrated, the support structure 14 is preferably in the form of a pair (at least two) of support members 18 that are connected together and positioned transversely with respect to one another, preferably at substantially right angles, and the plurality of insect trapping members 12 are preferably four in number, with one of the insect trapping members 12 being suspended from each end of each of the transversely positioned support members 18. A hanger member 20 extends vertically and at its lower end attaches to the support structure 14, while its upper end is provided with a hook apparatus 22 for engaging with a suitable structure in the ambient environment to allow the decorative insect trap 10 to be hung where desired. In FIG. 1, the decorative insect trap is shown deployed adjacent a window 24 provided in a structure, and, to this end, a simple screw hook 26 may be secured to a frame portion 28 of the window 24.

Figure 2:
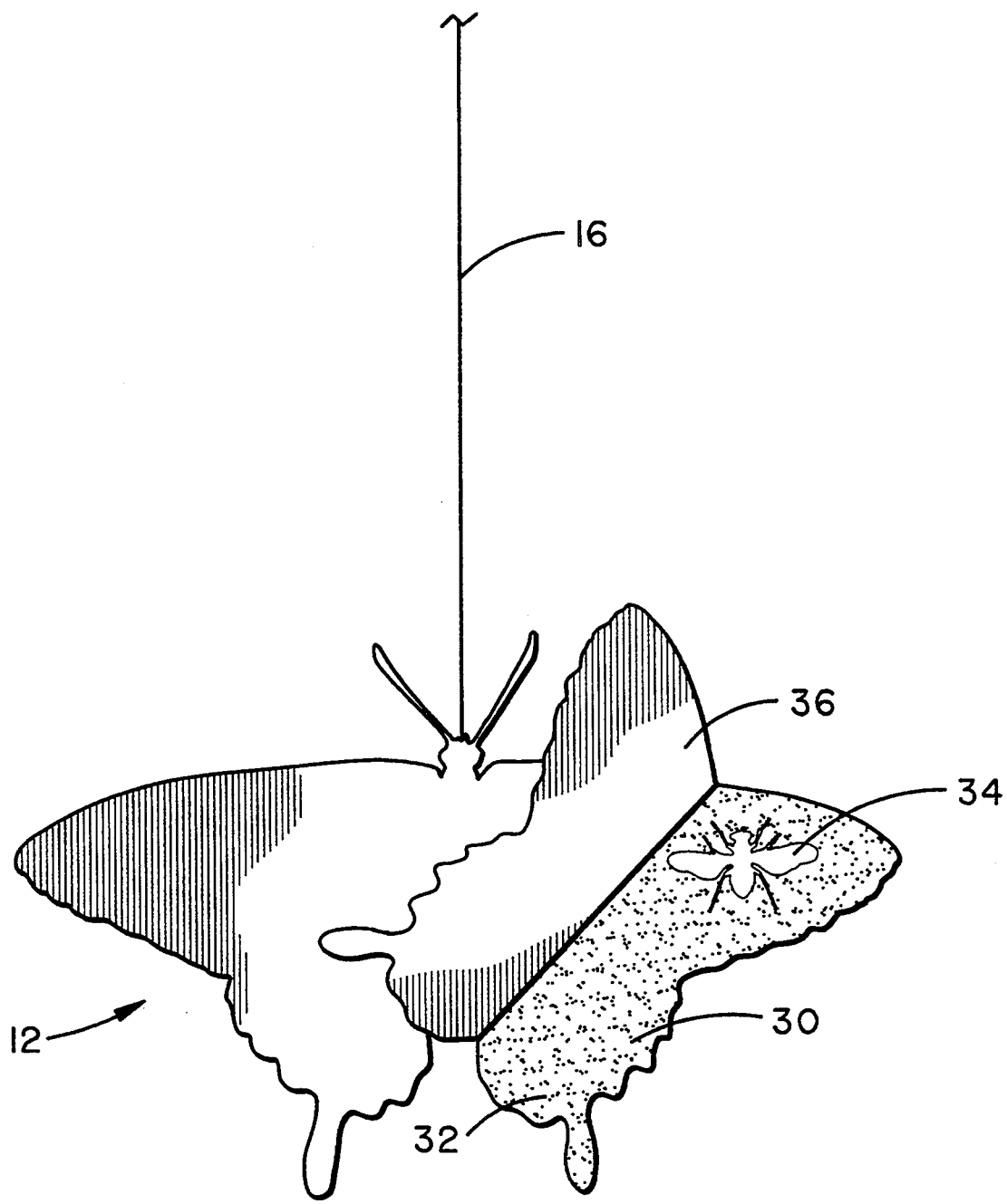
FIG. 2 is a front elevational view of a first embodiment of an individual insect trapping element of the inventive decorative insect trap.

In FIG. 2, the insect trapping member 12 is constructed of a substantially laminar member 30 which has a peripheral border that presents a viewer thereof with a decorative representation of a silhouette of an insect, for example, the butterfly silhouette shown in FIG. 2. The substantially laminar member 30 is coated on at least one side thereof with an insect trapping adhesive 32 that serves to trap any insect (e.g., for example, the insect 34) that alights thereon. Additionally, the insect trapping member 12 is preferably provided with an peel away backing member 36 that overlays the layer of the insect trapping adhesive 32 thereby covering the adhesive 32 until its removal just prior to deployment of the insect trapping member 12.

Figure 3:
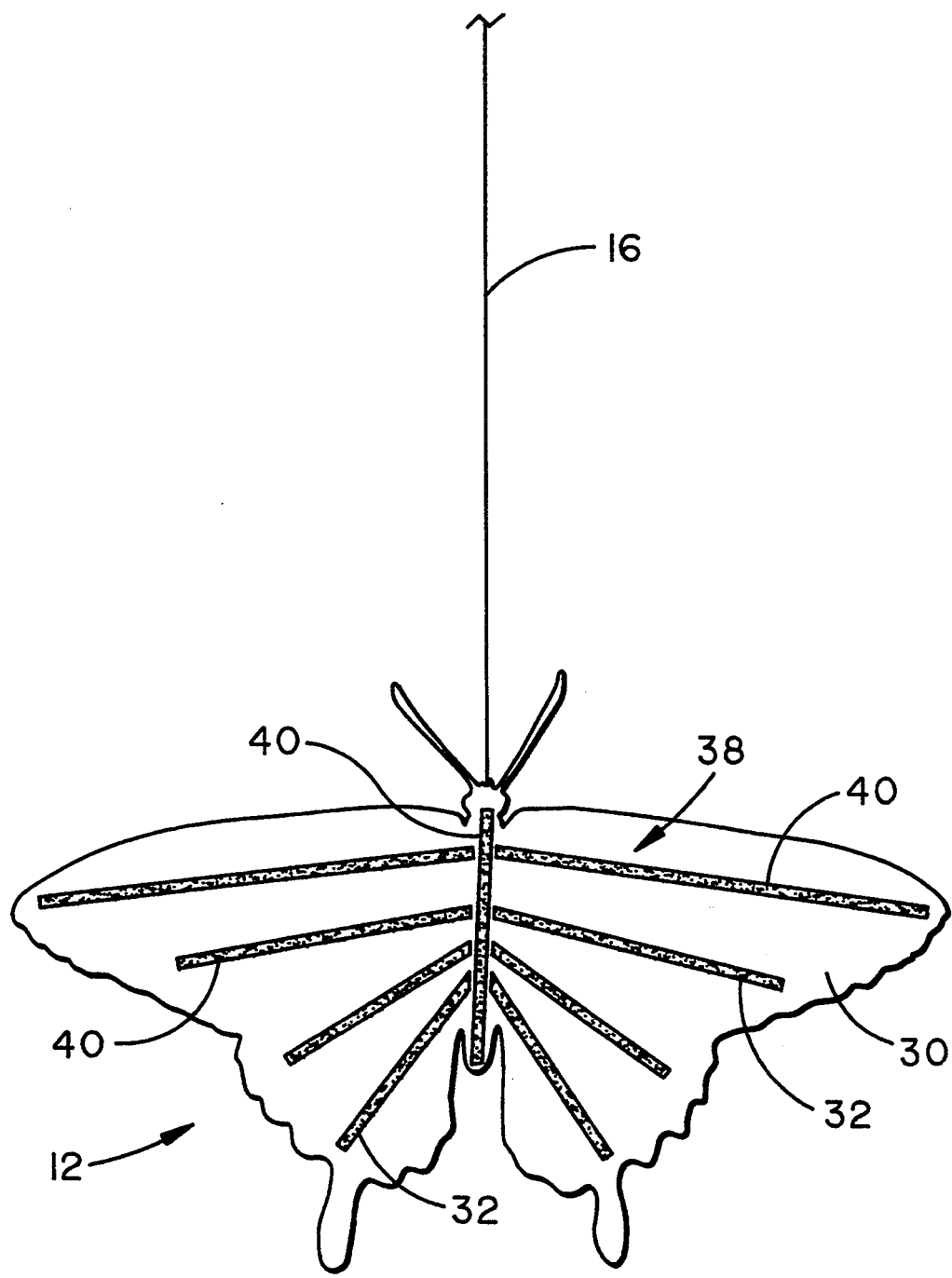
FIG. 3 is a front elevational view of an alternative embodiment of the individual insect trapping element of FIG. 2.

In FIG. 3, the insect trapping member 12 is also constructed of the substantially laminar member 30 and is additionally provided with a decorative design 38 on at least one face thereof, the decorative design 38 preferably being formed on the at least one face of the substantially laminar member 30 by the application thereto of the insect trapping adhesive 32 in a decorative pattern. Most preferably, the decorative design 38 may be formed by a plurality of discrete and spatially separated individual lines 40. For example, as shown in FIG. 3, the substantially laminar member 30 may be shaped so as to present to a viewer a silhouette of a butterfly, and the individual lines of the adhesive may be applied to at least one face thereof in a decorative design 38 that is suggestive of the thorax region and the radiating wing lines of a butterfly. A peel away backing member 36 that overlays the insect trapping adhesive can also be employed over the individual lines 40 of FIG. 3.

While the invention has been herein described by way of a particular preferred embodiment, various substitutions of equivalents may be effected without departing from the spirit and scope of the invention as set forth in the following claims.

For example, while a particular example of a butterfly has been used to illustrate how a decorative design can be incorporated into the decorative insect trap 10, it will be understood that other decorative designs (e.g., other flying insects, flower designs, etc) can be easily used and, as such, are contemplated as being within the scope of the present invention.

What is claimed is:

1. A decorative insect trap, comprising:
   a substantially laminar member;
   said substantially laminar member having a peripheral border that presents a viewer thereof with a decorative representation of a silhouette of an insect;
   an insect trapping adhesive applied to at least one surface of said substantially laminar member, said insect trapping adhesive being applied in a decorative pattern; said decorative pattern comprising a plurality of discrete and spatially separated individual lines; and a peel away backing member overlaying said insect trapping adhesive.

2. A decorative insect trapping device, said decorative insect trapping device comprising:

at least one support member; and at least two insect trapping members, each of said at least two insect trapping members comprising:

a substantially laminar member having a decorative design thereon; and an insect trapping adhesive applied in a decorative pattern to at least one surface of said substantially laminar member;

said decorative pattern comprising a plurality of discrete and spatially separated individual lines of said insect trapping adhesive applied to each said at least one surface to thereby form said decorative patterns;

said at least two insect trapping members being suspended from said at least one support member in a spaced relationship with respect to one another, 3. A decorative insect trapping device, said decorative insect trapping device comprising:

at least two support members;

said at least two support members being connected together and positioned substantially transverse to one another;

a hanging member for hanging said at least two connected support members; and at least four insect trapping members each of said at least four insect trapping members comprising:

a substantially laminar member, each of said substantially laminar members having a decorative design thereon;

an insect trapping adhesive applied in a decorative pattern to at least one surface of said substantially laminar member;

a first two of said at least four insect trapping members being suspended from a first of said at least two support members in a spaced relationship with respect to one another;

a second two of said at least four insect trapping members being suspended from a second of said at least two support members in a spaced relationship with respect to one another; and each of said at least four insect trapping members additionally comprising a peel away backing member overlaying said trapping adhesive.

* * * * *